Dec. 2, 1969

R. P. HAMLEN ET AL 3,481,788

GASEOUS FUEL CELL

Filed Jan. 18, 1965

Inventors:
Robert P. Hamlen,
Ronald R. Nilson,
Roland T. Girard, by Paul A. Frank
Their Attorney.

3,481,788
GASEOUS FUEL CELL
Robert P. Hamlen, Scotia, Ronald R. Nilson, Schenectady, and Roland T. Girard, Scotia, N.Y., assignors to General Electric Company, a corporation of New York
Continuation-in-part of application Ser. No. 183,810, Mar. 30, 1962. This application Jan. 18, 1965, Ser. No. 426,269
Int. Cl. H01m 27/16
U.S. Cl. 136—86　　　　　　　　　　　　　　　　2 Claims

ABSTRACT OF THE DISCLOSURE

A fuel cell includes an electrolyte component comprising a double pore matrix having micropores and macropores of larger diameter than the micropores, and an electrolyte lying within the micropores. Such a fuel cell includes also a porous cathode and a non-porous, hydrogen permeable anode.

---

Our invention relates to an improved immobilized electrolyte fuel cell utilizing a double pore matrix. This application is a continuation-in-part of our copending application Ser. No. 183,810, filed Mar. 30, 1962.

Fuel cells employing immobilized electrolytes are well known in the art. A common form of immobilized electrolyte fuel cell includes an alkali carbonate electrolyte in combination with a particular refractory, such as magnesium oxides, which serves to physically immobilize the electrolyte as a fluid while permitting the electrolyte to retain ionic mobility. The particulate refractory alone is usually referred to as a matrix while the electrolyte and matrix in combination are generally referred to as an electrolyte component, tablet, disk, or the like.

Conventional immobilized electrolyte fuel cells consist of a gas impervious electrolyte component, a porous metal electrode which catalyzes the anode reaction in contact with one major surface of the electrolyte component, a porous metal electrode which catalyzes the cathode reaction in contact with the opposing major surface of the electrolyte component, and means for supplying the reactant fuel and oxidant gases to the respective electrodes. When an anionic electrolyte is employed, an oxidant gas is transported ionically through the molten electrolyte component and the reaction product is formed on the anodic side of the cell. Assuming alkali carbonate as an electrolyte, hydrogen as a fuel, and a mixture of oxygen and carbon dioxide as the oxidant, an exemplary cell produces gaseous water and carbon dioxide on the hydrogen side of the cell. Exhaust of gaseous products from the cell occurs through the porous anode because the electrolyte component has been traditionally made nonporous to avoid any possible mixing of the gaseous reactants.

Venting cell products only through the porous anode not only dilutes the fuel but can also increase the carbon dioxide requirement in the oxidant. Dilution of the fuel with cell products lowers operating performance since some fuel must be used to flush the products from the cell. Modification of the conventional cells which would provide venting through the electrolyte component or cathode has not heretofore been deemed feasible, since such modification would result in bulk transport of the fuel and oxidant into the electrolyte thereby creating an explosion hazard.

It is an object of the invention to provide a fuel cell which employs an electrolyte component capable of transporting the gaseous products of electrochemical reaction away from the anode.

It is another object of the invention to provide a fuel cell which employs an improved electrolyte component in association with means for preventing the explosive mixture of fuel and oxidant reactants within the fuel cell.

It is a further object of the invention to provide an alkali carbonate fuel cell capable of transporting carbon dioxide formed at the anode to the cathode to supplement the carbon dioxide content of the oxidant while maintaining the fuel reactant free of reaction products.

These and other important objects and advantages of the invention are apparent from the following description taken in connection with the accompanying drawings in which.

Figure 1:
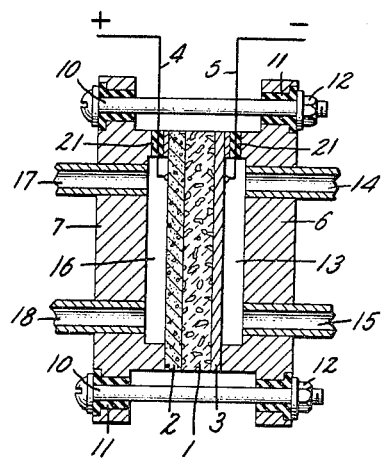
FIGURE 1 is a cross-sectional view illustrating a fuel cell.

Briefly, fuel cells constructed according to our invention include an electrolyte component formed of a double pore matrix and an electrolyte. The matrix is formed of an inert material provided with micropores therein. When the matrix is formed of particulate material, these micropores may be formed by the interstices between adjacent particles or granules. Electrolyte is held in the micropores by capillary attraction. The matrix additionally includes an interconnecting network of macropores sufficiently larger than the micropores to permit selective capillary retention of the electrolyte in the micropores. The electrolyte component is employed in a fuel cell in combination with a nonporous, hydrogen permeable anode, a porous cathode, and means capable of delivering fuel and oxidant reactants to the anode and cathode, respectively.

The double pore matrix employed in our invention includes micropores which retain electrolyte by capillary attraction and macropores which are generally free of electrolyte. The micropores may range in size from approximately 0.1 to 250 microns, preferably 1 to 25 microns. The macropores are sufficiently larger than the micropores to permit selective capillary retention in the micropores. It is generally preferred that the macropores have an average diameter of from 2 to 25 times that of the micropores. The macropores form an interconnecting network of electrolyte-free passages extending through the matrix. The macropores may account for anywhere from 5 to 95 percent, preferably 10 to 80 percent, of the matrix volume. The micropores are preferably completely filled with electrolyte, although only sufficient electrolyte need be employed to provide ionic continuity across the matrix.

Various processes of forming double pore matrices of the type described are within the knowledge of the art. A preferred process is comprised of casting a particulate refractory, such as magnesium oxide, for example, within a mold containing particles of a material selectively disintegrable at temperatures above the casting temperature but below the disintegration temperature of the refractory. Naphthalene crystals are well suited for this purpose. After the matrix is cast and hardened, the selectively disintegrable material may be removed by heating of the matrix leaving an interconnecting network of macropores in the volume originally displaced thereby. The micropores are, of course, formed as interstitial pores between the particles or granules of refractory.

The double pore matrix may be selectively impregnated with electrolyte after formation so that electrolyte is present in only the micropores. If the volume of the disintegrable material and the particle size of the refractory material are known, the volume of the micropores may be readily calculated. If the pore volume of the micropores and/or the macropores is unknown, these may be determined according to well-known test procedures using a mercury porosimeter or like apparatus. Knowing the pore volume of the micropores, only sufficient electrolyte is added to the double pore matrix to impregnate the micropores. Since the micropores exhibit a much higher capillary attraction for the electrolyte than the macropores, the micropores can be selectively and completely impregnated without blocking the macropores.

According to an alternate procedure, the macropores may be formed sufficiently large that eletcrolyte cannot be held therein by capillary attraction against the force of gravity. Such a double pore matrix may be immersed in electrolyte and stood on edge. Any electrolyte beyond that necessary to fill the micropores will drain from the matrix. Still another technique which may be employed is comprised of casting a mixture of refractory particles and electrolyte around a disintegrable material and subsequent to casting, heating the matrix to remove the disintegrable material leaving an interconnecting network of macropores. It is believed that other, equally advantageous methods will readily suggest themselves to those skilled in the art.

The composition of the electrolyte and matrix materials employed are well known and form no part of our invention. In the case of immobilized alkali carbonate fuel cells, the matrix is most commonly formed of magnesium oxide. In order to assure micropores of the desired dimensions, it is generally required that the magnesium oxide pass through 100 mesh screen. Magnesium oxide passing through 200 mesh or finer screens is generally preferred. The electrolyte may be formed of lithium carbonate, sodium carbonate, potassium carbonate, or similar alkali carbonates as well as mixtures thereof. Eutectic mixtures are generally preferred. A most preferred electrolyte in such cells is a ternary, equipart by weight, eutectic mixture of lithium, sodium and potassium carbonates.

The fuel cell cathode may be formed of any electrocatalytic material of known utility for such use. Such materials as nickel and copper as well as the oxides thereof may be employed, for example. In view of the corrosive environment within alkali carbonate cells, it is generally preferred to utilize therein electrocatalytic materials of high corrosion resistance such as metals of the light and heavy platinum triads, which are ruthenium, rhodium, palladium, osmium, iridium, and platinum, or other noble metals such as gold and silver. Silver is a generally preferred electrode material for alkali carbonate cells because of its corrosion resistance and relatively low cost.

Suitable cathodes may be formed having a porosity ranging from 20 to 95 percent by volume. Below approximately 20 percent by volume, the porosity of even thin, flame-sprayed cathodes offer substantial resistance to reactant penetration. Within the range of 30 to 80 percent by volume porosity, cathodes having high structural strength and reactant penetration may be formed by sintering metal particles into unitary structures. The Amour Research Foundation publication "Fiber Metallurgy" by J. I. Fisher, October 1961, discloses metal structures of suitable mechanical strength for use as electrodes having porosities as high as 95 percent by volume. It is generally preferred that the average pore size of the cathode be at least as large, preferably larger, than the size of the micropores within the matrix. As is well-recognized in the art, such arrangement offsets any tendency toward selective capillary retention of the electrolyte within the cathode. The thickness of the cathode is not critical. Flame-sprayed cathodes having thicknesses as low as 1 or 2 mils may be employed.

A nonporous, hydrogen permeable anode is employed in the fuel cell. The anode must have a permeability to hydrogen under the conditions of use of at least 0.01 cc./min./cm.$^2$, preferably 0.05 cc./min./cm.$^2$. Although nonporous, hydrogen permeable anodes have never been successfully employed in alkali carbonate fuel cells prior to our invention, such anodes are generally well known in the fuel cell art as illustrated, for example, in Grubb Patent 2,913,511. It is preferred to employ an anode formed of a metal foil. In alkali carbonate fuel cells, the anode is preferably formed of a corrosion resistant metal such as palladium, nickel, or palladium-silver alloyed in proportions of from 0 to 70 percent by weight silver, preferably from 0 to 50 percent by weight silver. Any anode thickness allowing hydrogen permeability above 0.01 cc./min./cm.$^2$ may be employed.

The use of a hydrogen-permeable, nonporous anode offers particular advantage in that a fuel comprising a mixture of a hydrocarbon and steam may be supplied to the cell without adversely affecting the operation thereof. As is well recognized in the art, steam and hydrocarbons react to form hydrogen. Selective withdrawal of the hydrogen formed by the reaction through permeation of the anode allows the hydrocarbon-steam reaction equilibrium to be shifted toward the generation of larger amounts of hydrogen. It is appreciated that the anode may be operated on hydrogen from any convenient source.

Figure 2:
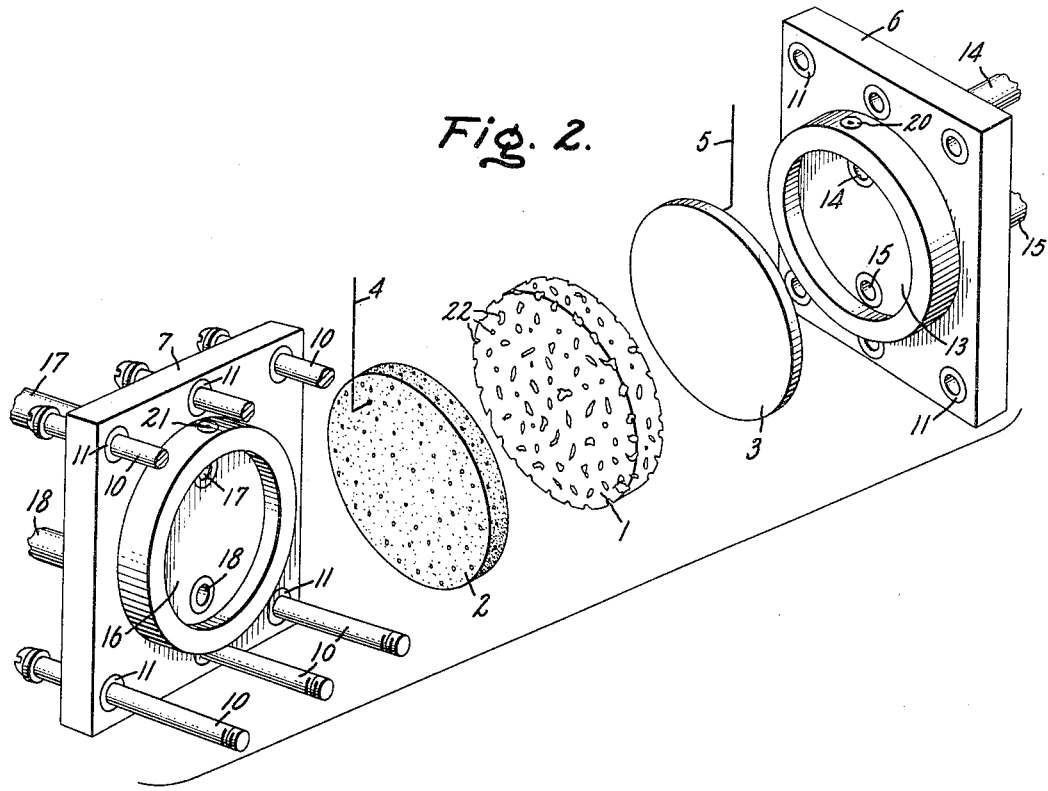
FIGURE 2 is an exploded perspective of the assembled fuel cell in FIGURE 1.

Referring to the drawings, FIGURES 1 and 2 illustrate a fuel cell comprising an electrolyte component 1 formed of a double pore matrix and an electrolyte. Cathode 2 and anode 3 are in physical contact with opposing major faces of the electrolyte component. Electrical leads 4 and 5 are attached to the gas side of the cathode and anode, respectively, for the purpose of conducting power produced in the cell to exterior load devices. The cathode, anode, and electrolyte components are supported in place by means of housing members 6 and 7 being joined with studs 10, insulating gaskets 11, and fastening nuts 12 as shown in the drawing. Housing member 6 comprises a metal casing having a cavity portion 13 for admission of a fuel gas to the exposed face of the anode through conduit 14 with an additional conduit 15 for exhausting any unreacted or excess fuel gas from the cavity. Likewise, housing member 7 comprises a metal casing with cavity portion 16 and conduits 17 and 18 for circulating an oxidant gas to the cathode electrode. The leads 4 and 5 are insulated from the housing members 6 and 7 by elastomeric bushings 20 and 21. The macropores 22 in the electrolyte component 1 are best shown in FIGURE 2, while the micropores are of insufficient size to be illustrated.

As will be readily appreciated by one skilled in the art, the fuel cell shown in the drawings is merely illustrative and not definitive of fuel cells constructed according to the invention. The fuel cell could, for example, be readily modified by insulating the housing members from the electrodes thereby obviating the need for gaskets 11. The leads 4 and 5 could be attached to the housing members or allowed to electrically contact the housing members by removal of bushings 20 and 21. Alternatively, the electrical leads may be insulated so that bushings 20 and 21 are unnecessary. Further, it is not necessary that the fuel cell construction be formed in the planar electrode configuration. Fuel cell constructions utilizing tubular electrodes in combination with bored electrolyte components or tubular electrolyte components are well known and may readily be used. Finally, the housing fixtures need not be formed of an electrically conductive material as shown but may be formed of an insulating material such as ceramic or glass.

The operation of a fuel cell constructed in accordance with our invention may be illustrated with reference to a fuel cell of the configuration shown in the drawings having an electrolyte component formed of a magnesium oxide double pore matrix and an alkali carbonate electrolyte. The fuel cell is first heated by external means, not shown, to a sufficiently elevated temperature for the alkali carbonate to become a molten liquid. With electrolytes comprising mixtures of lithium, sodium, and potassium carbonates, heating of the cell to temperatures in the range of 400° C. to 800° C. is adequate for melting of the carbonate mixture and cell operation commences with contact of hydrogen with the anode and a carbon dioxide-oxygen mixture with the cathode. A preferred oxidant mixture for operation of an alkali carbonate cell is comprised of approximately 33 percent by volume oxygen and approximately 67 percent by volume carbon dioxide. The hydrogen admitted to the anode of the cell at elevated temperatures permeates therethrough and reacts on the surface of the anode adjacent the electrolyte component with carbonate ions in the electrolyte to produce water and carbon dioxide while giving up electrons which are collected in the anode. The anode reaction may be expressed by the following reaction:

$$H_2 + CO_3^{-2} \rightarrow H_2O + CO_2 + 2e$$

In this reaction, the molten electrolyte provides a vehicle for transporting carbonate ions to the anode. The macropores in the double pore matrix permit migration of carbon dioxide to the cathode for completion of electrochemical reaction in the cell. Admission of the carbon dioxide-oxygen mixture to the exposed cathode surface results in oxygen penetration through the porous cathode followed by reaction on or near the surface of the cathode adjacent the electrolyte component of the oxygen with the carbon dioxide as follows:

$$2e + \tfrac{1}{2}O_2 + CO_2 \rightarrow CO_3^{-2}$$

In the above equation, it will be noted that the cathode reaction requires two electrons which are provided by electron migration from the anode through the external circuit.

In the analogous conventional fuel cell construction in which the cathode and anode are both porous and the electrolyte component is formed of a matrix having only micropores filled with electrolyte, cell operation is significantly different. Reaction products, such as carbon dioxide and water, are vented into the fuel rather than the oxidant resulting in dilution and waste of fuel. Further, since the carbon dioxide formed as a cell reaction product leaves the cell through the anode, more carbon dioxide is required to operate the conventional fuel cell construction than is necessary when the carbon dioxide is returned to the cathode. Finally, use of a nonporous anode to prevent dilution of the fuel with cell reaction products, as in our invention, is not possible in the conventional fuel cell construction, since the conventional electrolyte component is nonporous to gas and traps reaction products between the anode and electrolyte component thereby destroying the ionic contact of the anode and electrolyte.

The following examples are intended to illustrate and not to limit our invention.

EXAMPLE 1

An electrolyte component was formed by first forming a double pore matrix and then impregnating with electrolyte.

A slurry of 200 mesh magnesium oxide particles was first prepared in a 24° Baumé aqueous magnesium chloride solution and the slurry poured into a two and one-half inch diameter by one-half inch deep mold cavity which had previously been filled with naphthalene particles. The approximate particle size of the naphthalene material employed ranged from 0.046 to 0.033 inch in diameter. Water was removed from the poured casting by vacuum through the porous bottom in the mold cavity and residual magnesium chloride reacted with the magnesium oxide to increase the handling strength of the cast disk. The casting was then heated in the mold for 16 hours at 80° C. to 90° C. which completely volatilized the naphthalene, thereby creating the final double pore structure in the ceramic member. The disk was removed from the mold cavity and fired at 1800° C. to fully mature the ceramic followed by slow cooling over a twelve-hour period to room temperature. The double pore matrix for the electrolyte component was obtained by cutting a 3/16 inch end slice from the fired disk. The double pore matrix was impregnated with 8.5 grams of an equi-part by weight mixture of lithium carbonate, sodium carbonate, and potassium carbonate. The amount of electrolyte employed was calculated to be sufficient to fill the micropores formed by the interstices between the particles of magnesium oxide but to be insufficient to bridge or block the macropores formed by the voids remaining after removal of the naphthalene crystals.

EXAMPLE 2

For purposes of comparison, a conventional electrolyte component was formed. The matrix was formed according to the procedure set out in Example 1, except that no naphthalene crystals were placed in the mold at the time of casting; hence, no macropores were formed. The matrix was formed with a thickness of 3/32 inch. The matrix was impregnated with an equi-part by weight mixture of lithium, sodium, and potassium carbonates according to conventional practice so as to contain approximately 3.5 to 4 grams.

EXAMPLE 3

Each of the electrolyte components formed by Examples 1 and 2 was provided with a cathode by flame spraying uniformly over one major surface with 3.38 grams of silver to yield an approximately 1/32 inch thick porous silver coating. Each of the electrolyte components were provided with an anode by pressing an approximately 0.003 inch thick, nonporous, hydrogen-permeable palladium-silver alloy foil consisting essentially of 75 percent by weight palladium and 25 percent by weight silver onto the matrix face opposite the cathode.

EXAMPLE 4

The electrolyte component formed by the procedure of Example 1 and having electrodes provided by the procedure of Example 3 was mounted in a fuel cell configuration of the type shown in the drawings. The cell was operated at 600° C. An oxidant consisting essentially of 33 percent by volume oxygen and 67 percent by volume carbon dioxide was fed to the cathode at a rate of approximately 150 cc./min. Hydrogen was fed to the anode at a rate of approximately 150 cc./min. The following test results were obtained:

TABLE I

| Volts | Milliamperes |
| --- | --- |
| 0.92 | 0 |
| 0.86 | 104 |
| 0.80 | 235 |
| 0.70 | 497 |
| 0.60 | 760 |
| 0.50 | 1050 |
| 0.40 | 1380 |

EXAMPLE 5

The electrolyte component formed by the procedure of Example 2 and having electrodes provided by the procedure of Example 3 was mounted in a fuel cell configuration of the type shown in the drawings. The cell was operated at approximately 700° C. An oxidant consisting essentially of 33 percent by volume oxygen and 67 percent by volume carbon dioxide was fed to the cathode at a rate of approximately 150 cc./min. Hydrogen was fed to the anode at a rate of approximately 150 cc./min. The following test results were obtained:

TABLE II

| Volts: | Milliamperes | Remarks |
|---|---|---|
| 0.82 | 0 | Initial no load readings at 701° C. |
| 0.30 | 630 | Initial load readings at 701° C. under load. |
| 0.27 | 0 | 24-hour operation, no load readings at 700° C. |
| 0.22 | 230 | 24-hour operation, load readings at 701° C. |

Upon disassmbely of the fuel cell, it was noted that the anode was bulged away from the electrolyte componen at all points except where held in direct contact by the housing member. This was believed to be caused by the inability of the cell to transport the water formed at the anode to the cathode. Further, the bulging of the anode thereby reducing the ionic contact with the electrolyte component is believed to account for the rapid decline in performance characteristics of the cell.

While the invention has been described with reference to certain specific embodiments, it is intended that the scope of the invention be determined by reference to the following claims.

What we claim as new and desire to secure by Letters Patent of the United States is:

1. A fuel cell comprising
an electrolyte component including
a double pore matrix having micropores and macropores of larger diameter than said micropores,
and an electrolyte lying substantially only within the micropores,
a porous cathode in contact with one surface of said electrolyte component,
a nonporous, gas-permeable anode in contact with a remaining surface of said electrolyte component, and
means separately supplying oxidant and fuel to said cathode and said anode respectively.

2. A high temperature fuel cell comprising
an electrolyte component including
a double pore matrix comprising a shaped mass of refractory particles, said matrix having interstitial micropores formed between said refractory particles, said matrix having a network of macropores of larger average diameter than said micropores, and
alkali carbonate substantially only within the interstitial micropores of said matrix,
a porous cathode in contact with one surface of said electrolyte component,
a nonporous, fuel permeable anode in contact with a remaining surface of said electrolyte component, and
means separately supplying oxidant and fuel to said cathode and said anode respectively.

References Cited

UNITED STATES PATENTS 3,291,643 12/1966 Oswin et al.
3,216,911 11/1965 Kronenberg _____ 136—86

WINSTON A. DOUGLAS, Primary Examiner

H. A. FEELEY, Assistant Examiner

U.S. Cl. X.R.

136—153